(12) United States Patent
Chen et al.

(10) Patent No.: US 12,330,760 B2
(45) Date of Patent: Jun. 17, 2025

(54) COOPERATIVE POSITIONING SYSTEM AND METHOD FOR UNMANNED UNDERWATER VEHICLE (UUV) CLUSTER BASED ON RANGING AND INFORMATION INTERACTION

(71) Applicant: Zhejiang University, Hangzhou (CN)

(72) Inventors: Huifang Chen, Hangzhou (CN); Lei Xie, Hangzhou (CN); Feng Liu, Hangzhou (CN); Wen Xu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 269 days.

(21) Appl. No.: 18/317,050

(22) Filed: May 12, 2023

(65) Prior Publication Data

US 2024/0375757 A1  Nov. 14, 2024

(51) Int. Cl.
| | |
|---|---|
| *G01S 19/49* | (2010.01) |
| *B63G 8/00* | (2006.01) |
| *B63G 8/39* | (2006.01) |
| *G01S 5/18* | (2006.01) |

(52) U.S. Cl.
CPC .............. *B63G 8/001* (2013.01); *B63G 8/39* (2013.01); *G01S 5/18* (2013.01); *G01S 19/49* (2013.01); *B63G 2008/004* (2013.01)

(58) Field of Classification Search
CPC .... B63G 8/001; B63G 8/39; B63G 2008/004; G01S 5/18; G01S 19/49
See application file for complete search history.

*Primary Examiner* — Mathew Franklin Gordon
(74) *Attorney, Agent, or Firm* — AVEK IP, LLC

(57) ABSTRACT

Some embodiments of the disclosure provide a cooperative positioning system and method for an unmanned underwater vehicle (UUV) cluster based on ranging and information interaction. In some examples, the cooperative positioning system includes one master UUV, multiple slave UUVs, and a cooperative positioning apparatus. In some examples, the cooperative positioning method includes following steps. A master UUV and a slave UUV perform internal clock disciplining. The master UUV periodically packages a location of the master UUV and a covariance matrix of location estimation into a cooperative positioning data packet and broadcasts the cooperative positioning data packet to slave UUVs of a cluster. The slave UUV receives the cooperative positioning data packet. A cooperative positioning apparatus of the salve UUV constructs a state and a measurement equation according to data. The cooperative positioning apparatus calculates and obtains a cooperative positioning result by using an extended Kalman filter (EKF).

3 Claims, 1 Drawing Sheet

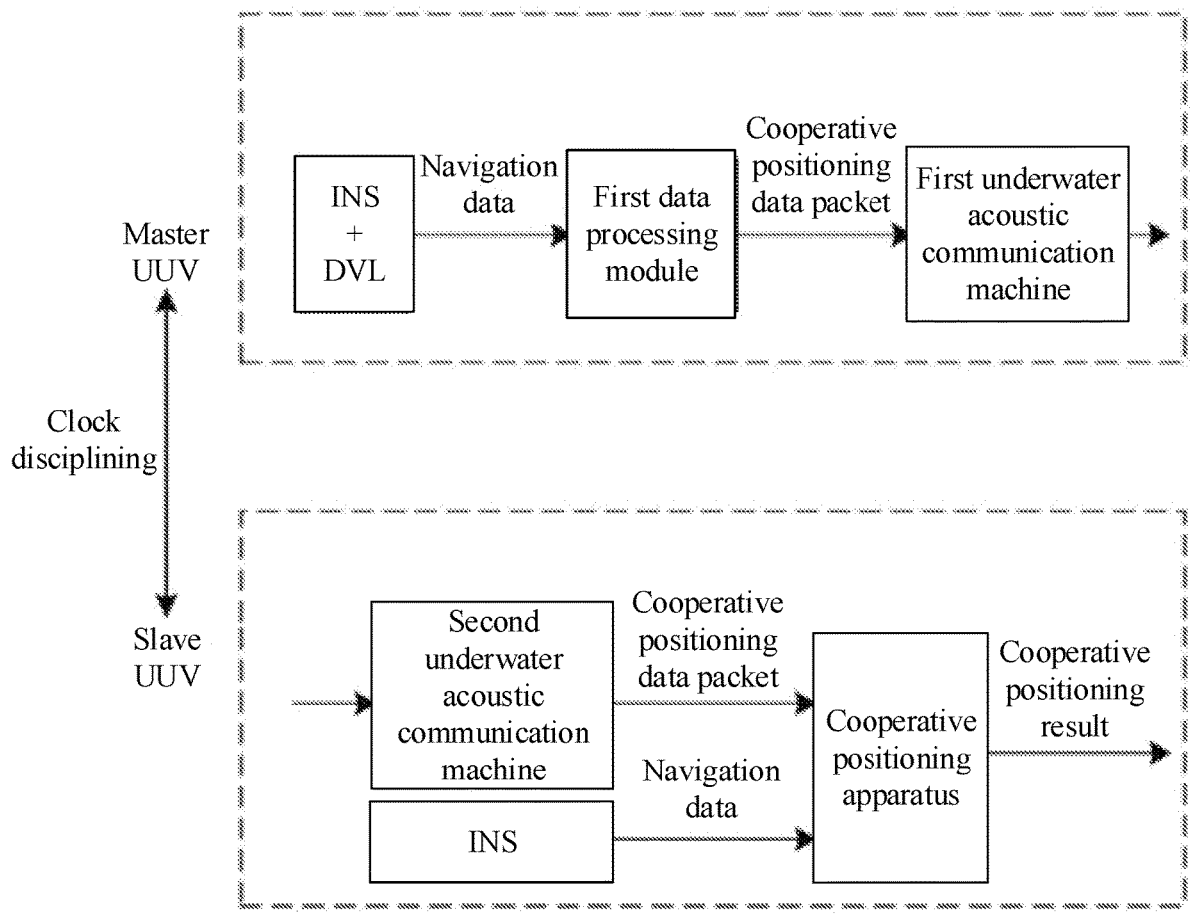

COOPERATIVE POSITIONING SYSTEM AND METHOD FOR UNMANNED UNDERWATER VEHICLE (UUV) CLUSTER BASED ON RANGING AND INFORMATION INTERACTION

FIELD OF THE DISCLOSURE

The disclosure relates generally to the field of acoustic positioning technologies. More specifically, the disclosure relates to acoustic positioning technologies of underwater vehicle clusters and relates to cooperative positioning systems and methods for unmanned underwater vehicle (UUV) clusters based on ranging and information interaction.

BACKGROUND

The ocean is rich in resources. With increasing depletion of resources on land, more countries around the world gradually focus on development and protection of the ocean. As an important competition field for future national marine security and economic development, importance of ocean research is self-evident. In recent years, the development of underwater vehicles, for example, UUVs, also accelerates a process of ocean exploration and research. However, compared with the terrestrial environment, the underwater environment is often worse, causing that signals such as a light wave and radio commonly used on land are greatly attenuated or dispersed under the water. Consequently, many mature commercial communication and navigation modes on land are not applicable under the water.

A sound wave has less underwater attenuation and a longer underwater propagation range than the light wave and the radio. Therefore, the sound wave is more suitable as a signal carrier for underwater communication and positioning navigation. A series of acoustic theories, technologies, and products also develop gradually, which makes important contributions in the field of ocean research.

For underwater exploration and task execution, a single UUV has defects such as a small coverage area and a small carried load of a task. Therefore, a working mode of a UUV cluster is gradually developed with reference to working modes of a wolf group on land, a whale group in the ocean, and the like. This method allows multiple UUVs to perform a task in formation, overcoming the defects of the single UUV. UUV clusters work in three modes: a master-slave mode, a layered mode, and a parallel mode. The master-slave mode is a most common working mode. In this mode, there is one or more navigators in the cluster. These master vehicles as navigators carry more loads, and have more comprehensive capabilities of detection, positioning, and processing. A slave vehicle follows the master vehicle to work, and implement information interaction with the master vehicle through underwater acoustic communication, to implement functions such as task distribution, formation control, and data aggregation. In the layered mode, concepts of master and slave vehicles are weakened. According to precision layers of loads carried by different vehicles, vehicles of the whole formation are classified into different precision layers. Vehicles at a same layer may perform information interaction with each other, and a vehicle at a low precision layer is controlled by a vehicle at a high precision layer. In the parallel mode, there is no differences between master and slave and between high precision and low precision, and all vehicles may implement information interaction with each other.

For a UUV cluster in the master-slave mode, a master vehicle, as a core of the cluster, undertakes important functions such as task allocation, information aggregation, and navigation assistance. Due to limitations such as a volume and costs, a slave vehicle is provided with a sensor with poor precision, and consequently has poor positioning precision.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the cooperative positioning system in the present disclosure includes a master UUV, a slave UUV, and a cooperative positioning apparatus.

Optionally, the cooperative positioning system includes following components.

(1) One master UUV, including but being not limited to a large-scale autonomous underwater vehicle (AUV) or the like, carrying a Doppler velocity log (DVL), a high-precision inertial navigation system (INS), a first satellite unit module, a first underwater acoustic communication machine, a first main control unit module, a first power system, a first data processing module, and a first clock module.

The DVL locks the water and the water bottom, and is configured to measure a velocity of the master UUV.

The high-precision INS is configured to estimate a location and a corresponding motion posture of the master UUV.

The first satellite unit module is configured to receive satellite location update and communication with a control center when the master UUV emerges from the sea.

The first underwater acoustic communication machine is configured to support underwater communication between the master UUV and the slave UUV, and enable the master UUV to report a status to the control center and receives an instruction and data of the control center.

The first main control unit module is configured to control floating, diving, and task switching of the master UUV.

The first power system is configured to output power required by the master UUV.

The first data processing module is configured to output a location of the master UUV with reference to data of the DVL and the INS, and generate a cooperative positioning data packet.

The first clock module is configured to provide a clock reference.

(2) A plurality of slave UUVs, including but being not limited to small-scale AUVs and the like. Each slave UUV carries a low-precision INS, a second satellite unit module, a second underwater acoustic communication machine, a second main control unit module, a second power system, a second data processing module, and a second clock module.

The low-precision INS outputs a positioning result and a corresponding motion posture of the slave UUV.

The second satellite unit module is configured to receive satellite location update and communication with the control center when the slave UUV emerges from the sea.

The second underwater acoustic communication machine is configured to support underwater communication between the slave UUV and the master UUV, and configured to receive the cooperative positioning data packet.

The second main control unit module is configured to control floating, diving, and task switching of the slave UUV, and has an integrated function of communication and positioning.

The second power system is configured to output power required by the slave UUV.

The second data processing module is configured to process internal data of the slave UUV.

The second clock module is configured to provide another clock reference.

(3) The cooperative positioning apparatus, installed on the slave UUV, configured to execute a cooperative positioning algorithm and output a cooperative positioning result.

The cooperative positioning apparatus includes a primary navigation unit and a secondary navigation unit, the primary navigation unit performs location estimation by using data of the INS of the slave UUV, and the secondary navigation unit performs filtering processing by using acoustic ranging and the cooperative positioning data packet.

The cooperative positioning apparatus provides two interfaces outwards: a communication interface in connection with the data processing module and a communication interface in connection with the underwater acoustic communication machine. interface communication uses a serial communication consisting of a ground cable, a transmitting TX, and a receiving RX, and uses a software handshaking XON/XOFF mode to establish a communication connection. When communication is required, a receive end sends XON to a transmit end to start to receive data, and the transmit end starts to send data after receiving XON. or when no communication is required, the receive end feeds back XOFF to end communication.

(3-1) The communication interface in connection with the data processing module: the slave UUV inputs, at a frequency of 1 Hz by default, longitude, latitude, velocity, heading, depth, and timestamp data that are acquired by the INS to the cooperative positioning apparatus, and the cooperative positioning apparatus outputs longitude and latitude data obtained after cooperative positioning to the slave UUV.

Information interaction between the cooperative positioning apparatus and the slave UUV is as follows: the cooperative positioning apparatus sends XON to the second data processing module to start to receive the information when needing status information, and sends XOFF to end communication until there is no need. the second data processing module starts to send status information including longitude and latitude after receiving XON of the cooperative positioning apparatus, and stops sending until receiving XOFF. the second data processing module sends XON to the cooperative positioning apparatus when needing the cooperative positioning result, and sends XOFF to stop communication until the result is not needed. The cooperative positioning apparatus starts to send the cooperative positioning result after receiving XON of the slave UUV, and stops sending until receiving XOFF.

(3-2) The communication interface in connection with the underwater acoustic communication machine: after receiving the cooperative positioning data packet of the master UUV, the second underwater acoustic communication machine inputs, to the cooperative positioning apparatus, parsed packet information and a time of arrival that is of the cooperative positioning data packet and that is recorded by the underwater acoustic communication machine.

Information interaction between the cooperative positioning apparatus and the second acoustic communication receiver is as follows: the cooperative positioning apparatus sends XON to the second underwater acoustic communication machine when needing information received by the second underwater acoustic communication machine, and sends XOFF until the information is not needed. The second underwater acoustic communication machine receives, after receiving XON, the cooperative positioning data packet of the master UUV and inputs cooperative positioning data packet and a time of arrival of the cooperative positioning data packet to the cooperative positioning apparatus, and stops sending until receiving XOFF.

A working mode of the cooperative positioning system is as follows:

The master UUV fuses the data of the DVL and the high-precision INS, outputs a high-precision reference location of the master UUV, packages key information into the cooperative positioning data packet, and broadcasts the cooperative positioning data packet to the slave UUVs in the cluster at a fixed time interval by using the first underwater acoustic communication machine. The key information includes the location of the master UUV, information about a state covariance matrix, and a sending timestamp.

The low-precision INS of the slave UUV has a high update frequency, and uses data that is acquired by the low-precision INS and that includes longitude and latitude as that of the primary navigation unit in the cooperative positioning apparatus, the secondary navigation unit in the cooperative positioning apparatus has a low update frequency. after receiving the cooperative positioning data packet of the master UUV, the second underwater acoustic communication machine records a time of arrival of the cooperative positioning data packet, and inputs the time of arrival and parsed content of the cooperative positioning data packet to the cooperative positioning apparatus. The cooperative positioning apparatus performs cooperative positioning processing according to information input by the second underwater acoustic communication machine, and outputs updated positioning information to the slave UUV to complete cooperative positioning.

The present disclosure further provides a cooperative positioning method for a UUV cluster based on ranging and information interaction. The cooperative positioning method may include following steps.

Step (1): a master UUV and a slave UUV perform internal clock disciplining before being launched into water, keep clock synchronization, and start underwater work after disciplining is completed. A first satellite unit module of the master UUV and a second satellite unit module of the slave UUV start to work, and initialize positioning information of the master UUV and the slave UUV.

Step (2): after a stable working state is entered, a first data processing module of the master UUV generates a cooperative positioning data packet at a fixed period T'. The cooperative positioning data packet includes longitude $L_{M,k}$, latitude $B_{M,k}$, a depth $d_{M,x}$, a velocity $v_{M,k}$, a heading $\varphi_{M,k}$, a positioning standard deviation in an X direction $\sigma_{Mx,k}$, a positioning standard deviation in a Y direction $\sigma_{My,k}$, and a packet time of emission $t_k^e$, and a subscript M represents the master UUV and a subscript k represents a $k^{th}$ positioning timeslot. Broadcasts the cooperative positioning data packet to slave UUVs in a cluster.

Step (3): after receiving the cooperative positioning data packet, a second underwater acoustic communication machine records a time of arrival $t_k^a$ of the cooperative positioning data packet, parses information in the cooperative positioning data packet, and processes the longitude and the latitude of the master UUV in the cooperative positioning data packet to convert the longitude and the latitude into an XY coordinate system location $(x_{M,k}, y_{M,k})$=LB2XY$(L_{M,k}, B_{M,k})$. LB2XY$(\cdot,\cdot)$ represents a conversion operation between the longitude and the latitude and an XY coordinate system. A second data processing module obtains data of an INS, including longitude $L_{S,k}$, latitude $B_{S,k}$, a depth $d_{S,k}$, a velocity $v_{S,k}$, a heading $\varphi_{S,k}$, and angular acceleration $\omega_{S,k}$ that are of the slave UUV. A subscript S represents the slave UUV, processes the longitude and the latitude of the slave UUV in the data to convert the longitude and the latitude into an XY coordinate system location $(x_{S,k}, y_{S,k})$=LB2XY$(L_{S,k}, B_{S,k})$, and inputs, to a cooperative positioning apparatus, a location of the master UUV, a location of the slave UUV, the parsed information of the cooperative positioning data packet, and remaining output information of the second data processing module of the slave UUV.

Step (4): the cooperative positioning apparatus establishes a state transition equation and a measurement equation, and performs filtering processing by using the parsed information in the cooperative positioning data packet to complete cooperative positioning. The method may include following steps.

Step (4-1): establishing a state vector and the state transition equation.

When the slave UUV is in a state of steady state operation, a motion status $\Psi_{S,k}$ of the slave UUV at the $k^{th}$ positioning timeslot is expressed as a combination $\Psi_{S,k}=[x_{S,k}, y_{S,k}, \varphi_{S,k}]^T$ of the XY coordinate system location and the heading. $[\cdot]^T$ represents a transpose operation.

Under an update frequency of the fixed period T', an estimation status of the slave UUV at the $k^{th}$ positioning timeslot $\overline{\Psi}_{S,k}=[\overline{x}_{S,k}, \overline{y}_{S,k}, \overline{\varphi}_{S,k}]^T$, and a motion equation is slave UUV at the $k^{th}$ positioning timeslot expressed as $$\begin{cases} \overline{x}_{S,k} = x_{S,k-1} + T'v_{S,k-1}\cos\varphi_{S,k-1} \\ \overline{y}_{S,k} = y_{S,k-1} + T'v_{S,k-1}\sin\varphi_{S,k-1} \\ \overline{\varphi}_{S,k} = \varphi_{S,k-1} + T'\omega_{S,k-1} \end{cases}.$$

A current state is combined with a state cached in a preorder to construct a combined state vector $\overline{\Psi}_k[\Psi_{S,k}^T, \Psi_{S,k-1}^T, \ldots, \Psi_{S,k-N+1}^T]^T$. N represents a cached order, and a corresponding covariance matrix is $\overline{P}_k$.

A combined motion prediction model $\overline{\Psi}_k=f(\Psi_{k-1}, u_{S,k-1})+n_k$. $u_{S,k-1}$ represents a motion velocity of the slave UUV as a measurement input, and $n_k$ represents an estimation error, which follows Gaussian distribution. a state equation $f(\cdot,\cdot)$ is a nonlinear function about the state vector, with a Jacobi matrix of $f_k$, and linear processing of the prediction model is expressed as $\overline{\Psi}_k=F_k\Psi_{k-1}F_k^T+Bu_{S,k-1}B^T+n_k$. B represents an input control matrix.

A covariance matrix $\overline{P}_k$ corresponding to $\overline{\Psi}_k$ is expressed as $\overline{P}_R=F_kP_{k-1}F_k^T+Q_k$. $Q_k$ is an introduced state transition error, $$Q_k = \begin{bmatrix} (T')^2\sigma_{v_{S,k-1}}^2\cos^2\varphi_{S,k-1} & (T')^2\sigma_{v_{S,k-1}}^2\cos\varphi_{S,k-1}\sin\varphi_{S,k-1} & 0 \\ (T')^2\sigma_{v_{S,k-1}}^2\sin\varphi_{S,k-1}\cos\varphi_{S,k-1} & (T')^2\sigma_{v_{S,k-1}}^2\sin^2\varphi_{S,k-1} & 0 \\ 0 & 0 & \sigma_{\varphi_{S,k-1}}^2 \end{bmatrix},$$

$\sigma_{v_{S,k}}$ and $\sigma_{\varphi_{S,k}}$ respectively represent a standard deviation of velocity measurement and a standard deviation of heading measurement of the slave UUV.

After an augmentation operation is completed once on the state vector, $\overline{\Psi}_k=[\Psi_k^T, \Psi_{k-1}^T]^T$, and the covariance matrix of the state vector is synchronously augmented and is modified and expressed as $$\overline{P}_k = \begin{bmatrix} Q_k & -F_k^TQ_k & 0 \\ -Q_kF_k & F_kQ_kF_k^T + P_{k-1}[1,1] & P_{k-1}[1,2] \\ 0 & P_{k-1}[2,1] & P_{k-1}[2,2] \end{bmatrix}.$$

$P_{k-1}[1,1]$, $P_{k-1}[1,2]$, $P_{k-1}[2,1]$, and $P_{k-1}[2,2]$ respectively represent upper left, upper right, lower left, and lower right submatrices of a covariance matrix $P_{k-1}$.

Step (4-2): augmenting the state vector, including:

The cooperative positioning apparatus adds the received information $\Psi_{M,k}$ of the master UUV on a basis of an original status to construct an augmented state vector $\tilde{\Psi}_k=[\Psi_{M,k}^T, \Psi_{M,k-2}^T, \ldots, \Psi_{M,1}^T, \overline{\Psi}_k^T]^T$. A corresponding covariance matrix is $\tilde{P}_k$, $\tilde{P}_k=\overline{P}_k+P_{M,k}-P_{M,k-1}$. and M,k represents a state covariance matrix of the master UUV.

Step (4-3): establishing the measurement equation, including:

Calculating a propagation range $r_k=c(t_k^a-t_k^e)$ according to the parsed time of emission $t_k^e$ and the locally recorded time of arrival $t_k^a$. C is an equivalent sound velocity.

At the $k^{th}$ positioning timeslot, expressing spatial location information of the slave UUV as $(\overline{x}_{S,k}, \overline{y}_{S,k}, d_{S,k})$, and expressing spatial location information of the master UUV as $(x_{M,k}, y_{M,k}, d_{M,k})$.

Constructing a ranging equation $$h(\tilde{\Psi}_k) = \sqrt{(\overline{x}_{S,k} - x_{M,k})^2 + (\overline{y}_{S,k} - y_{M,k})^2 + (d_{S,k} - d_{M,k})^2}$$

with respect to the state vector. Let measurement be affected by a white Gaussian noise $n_{S,k}$ with a zero mean, a measurement model is expressed as $z_k=h(\tilde{\Psi}_k)+\eta_{S,k}=r_k$, and a measurement deviation matrix is $R_k$.

Step (4-4): filtering update.

Because measurement about the state vector refers to a nonlinear function, linear processing may be performed on measurement to obtain a Jacobi matrix H of measurement, including: introducing innovation gain based on an extended Kalman filter (EKF) with reference to Step (4-1) to Step (4-3) to absorb innovation, to update a predicted state $\hat{\Psi}_k=\tilde{\Psi}_k+K_k(z_k-h(\tilde{\Psi}_k)+H_k\tilde{\Psi}_k)$. $\hat{\Psi}_k$ is an updated predicted state, $K_k$ is innovation gain at a timeslot k, $h(\tilde{\Psi}_k)$ represents the ranging equation, and $H_k$ is a Jacobi matrix of the measurement equation.

Obtaining innovation gain K by using a measurement matrix and a measurement deviation, and $K_k=\tilde{P}_kH_k^T(H_k\tilde{P}_kH_k^T+R_k)^{-1}$.

Synchronizing a covariance matrix $\hat{P}_k=(1-K_kH_k)\tilde{P}_k$ of the updated state based on the updated state and the innovation gain. I is a unit matrix.

Step (4-5): obtaining a positioning result by using ranging information, including:

Extracting an updated location $(\hat{x}_{S,k}, \hat{y}_{S,k})$ of the slave UUV from $\Psi_k$, and comparing the updated location with $(x_{S,k}, y_{S,k})$. In Step (3). When a difference of the two is less than or equal to a set threshold, updating is normal, the updated location is converted into latitude and longitude coordinates $(\hat{L}_{S,k}, \hat{B}_{S,k})$=XY2LB $(\hat{x}_{S,k}, \hat{y}_{S,k})$, and a cooperative positioning result is output, or when the difference between the two is greater than the set threshold, an updated result at this time is discarded, or when the cooperative positioning apparatus fails to receive input data of the underwater acoustic communication machine, extracting a location $(\overline{x}_{S,k}, \overline{y}_{S,k})$ of the slave UUV from 4, converting the location into latitude and longitude coordinates $(\overline{L}_{S,k}, \overline{B}_{S,k})$=XY2LB$(\overline{x}_{S,k}, \overline{y}_{S,k})$, and outputting a cooperative positioning result.

BRIEF DESCRIPTION OF THE DRAWING

Illustrative embodiments of the present disclosure are described in detail below with reference to the attached drawing FIGURE.

The FIGURE is a schematic diagram of logic of cooperative positioning processing of a master UUV and a slave UUV according to an embodiment of the disclosure.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

In some embodiments, a cooperative positioning system for a UUV cluster based on ranging and information interaction may include a master UUV, a slave UUV, and a cooperative positioning apparatus.

Optionally, the cooperative positioning system may include the following components.

(1) One master UUV, which may be an AUV or the like, carrying a DVL, a high-precision INS, a first satellite unit module, a first underwater acoustic communication machine, a first main control unit module, a first power system, a first data processing module, and a first clock module.

The DVL locks the water and the water bottom, and is configured to measure a velocity of the master UUV.

The high-precision INS is configured to estimate a location and a corresponding motion posture of the master UUV.

The first satellite unit module is configured to receive satellite location update and communication with a control center when the master UUV emerges from the sea.

The first underwater acoustic communication machine is configured to support underwater communication between the master UUV and the slave UUV, and enable the master UUV to report a status to the control center and receives an instruction and data of the control center The first main control unit module is configured to control floating, diving, and task switching of the master UUV.

The first power system is configured to output power required by the master UUV.

The first data processing module is configured to output a location of the master UUV with reference to data of the DVL and the INS, and generate a cooperative positioning data packet.

The first clock module is configured to provide a clock reference.

(2) three slave UUVs, which may be small-scale AUVs and the like. Each slave UUV carries a low-precision INS, a second satellite unit module, a second underwater acoustic communication machine, a second main control unit module, a second power system, a second data processing module, and a second clock module.

The low-precision INS outputs a positioning result and a corresponding motion posture of the slave UUV.

The second satellite unit module is configured to receive satellite location update and communication with the control center when the slave UUV emerges from the sea.

The second underwater acoustic communication machine is configured to support underwater communication between the slave UUV and the master UUV, and configured to receive the cooperative positioning data packet.

The second main control unit module is configured to control floating, diving, and task switching of the slave UUV, and has an integrated function of communication and positioning.

The second power system is configured to output power required by the slave UUV.

The second data processing module is configured to process internal data of the slave UUV.

The second clock module is configured to provide another clock reference.

The high-precision INS carried by the master UUV and the low-precision INS carried by the slave UUV have relatively high and low precision.

(3) the cooperative positioning apparatus, installed on the slave UUV, configured to execute a cooperative positioning algorithm and output a cooperative positioning result.

The cooperative positioning apparatus may include a primary navigation unit and a secondary navigation unit, the primary navigation unit performs location estimation by using data of the INS of the slave UUV, and the secondary navigation unit performs filtering processing by using acoustic ranging and the cooperative positioning data packet.

The cooperative positioning apparatus provides two interfaces outwards: a communication interface in connection with the data processing module and a communication interface in connection with the underwater acoustic communication machine. Interface communication uses a serial communication mode consisting of a ground cable, a transmitting TX, and a receiving RX, and uses a software handshaking XON/XOFF mode to establish a communication connection. When communication is required, a receive end sends XON to a transmit end to start to receive data, and the transmit end starts to send data after receiving XON. Or when no communication is required, the receive end feeds back XOFF to end communication.

(3-1) The communication interface in connection with the data processing module: the slave UUV inputs, at a frequency of 1 Hz by default, longitude, latitude, velocity, heading, depth, and timestamp data that are acquired by the INS to the cooperative positioning apparatus, and the cooperative positioning apparatus outputs longitude and latitude data obtained after cooperative positioning to the slave UUV.

Information interaction between the cooperative positioning apparatus and the slave UUV is as follows: the cooperative positioning apparatus sends XON to the second data processing module to start to receive the information when needing status information, and sends XOFF to end communication until there is no need. The second data processing module starts to send status information including longitude and latitude after receiving XON of the cooperative positioning apparatus, and stops sending until receiving XOFF. The second data processing module sends XON to the cooperative positioning apparatus when needing the cooperative positioning result, and sends XOFF to stop communication until the result is not needed. The cooperative positioning apparatus starts to send the cooperative positioning result after receiving XON of the slave UUV, and stops sending until receiving XOFF.

(3-2) The communication interface in connection with the underwater acoustic communication machine: after receiving the cooperative positioning data packet of the master UUV, the second underwater acoustic communication machine inputs, to the cooperative positioning apparatus, parsed packet information and a time of arrival that is of the cooperative positioning data packet and that is recorded by the underwater acoustic communication machine.

Information interaction between the cooperative positioning apparatus and the second acoustic communication receiver is as follows: the cooperative positioning apparatus sends XON to the second underwater acoustic communication machine when needing information received by the second underwater acoustic communication machine, and sends XOFF until the information is not needed. The second underwater acoustic communication machine receives, after receiving XON, the cooperative positioning data packet of the master UUV and inputs cooperative positioning data packet and a time of arrival of the cooperative positioning data packet to the cooperative positioning apparatus, and stops sending until receiving XOFF.

A working mode of the cooperative positioning system is as follows:

The master UUV fuses the data of the DVL and the high-precision INS, outputs a high-precision reference location of the master UUV, packages key information into the cooperative positioning data packet, and broadcasts the cooperative positioning data packet to the slave UUVs in the cluster at a fixed time interval by using the first underwater acoustic communication machine. The key information may include the location of the master UUV, information about a state covariance matrix, and a sending timestamp.

outputs updated positioning information to the slave UUV to complete cooperative positioning.

The FIGURE shows logic of cooperative positioning processing of a master UUV and a slave UUV. As shown in the FIGURE, three slave UUVs use a same cooperative positioning method. For an $i^{th}$ slave UUV. $i \in \{1, 2, 3\}$. The cooperative positioning method may include following steps.

Step (1): The master UUV (expressed by a subscript M) and the $i^{th}$ slave UUV (expressed by a subscript Si) perform internal clock disciplining before being launched into water, keep clock synchronization, and start underwater work after disciplining is completed. A first satellite unit module and a second satellite unit module start to work, and respectively initialize positioning information of the master UUV and the $i^{th}$ slave UUV.

Step (2): After a stable working state is entered, a first data processing module of the master UUV generates a cooperative positioning data packet at a fixed period T'. At a $k^{th}$ positioning timeslot, the cooperative positioning data packet may include longitude $L_{M,k}$, latitude $B_{M,k}$, a depth $d_{M,k}$, a velocity $v_{M,k}$, a heading $\varphi_{M,k}$, a positioning standard deviation in an X direction $\sigma_{Mx,k}$, a positioning standard deviation in a Y direction $\sigma_{My,k}$, and a packet time of emission $t_k^e$. Broadcasts the cooperative positioning data packet to slave UUVs in a cluster.

The cooperative positioning data packet may include a 1-byte start header SYN of the data packet, a 1-byte valid packet length LEN, 4-byte longitude M_LON, 4-byte latitude M_LAT, a 2-byte depth M_DEP, a 2-byte velocity M_VEL, a 2-byte heading M_HEAD, a 4-byte positioning standard deviation in an X direction and in a Y direction M_UNCX and M_UNCY, a 4-byte time of emission M_TIMET, and 2-byte frame check code FCC. A format of the cooperative positioning data packet is shown in the following table, and is then broadcast to the slave UUVs in the cluster.

| SYN | LEN | M_LON | M_LAT | M_DEP | M_VEL | M_HEAD | M_UNCX | M_UNCY | M_TIMET | FCC |
|---|---|---|---|---|---|---|---|---|---|---|
| 1 | 1 | 4 | 4 | 2 | 2 | 2 | 2 | 2 | 4 | 2 |

The low-precision INS of the slave UUV has a high update frequency, and uses data that is acquired by the low-precision INS and that may include longitude and latitude as that of the primary navigation unit in the cooperative positioning apparatus. The secondary navigation unit in the cooperative positioning apparatus has a low update frequency. After receiving the cooperative positioning data packet of the master UUV, the second underwater acoustic communication machine records a time of arrival of the cooperative positioning data packet, and inputs the time of arrival and parsed content of the cooperative positioning data packet to the cooperative positioning apparatus. The cooperative positioning apparatus performs cooperative positioning processing according to information input by the second underwater acoustic communication machine, and Step (3): A second data processing module of the $i^{th}$ slave UUV obtains data of an INS, processes longitude and latitude of the slave UUV in the data to convert the longitude and the latitude into an XY coordinate system location ($x_{Si,k}$, $y_{Si,k}$)=LB2XY($L_{Si,k}$,$B_{Si,k}$) LB2XY( ) represents a conversion operation between the longitude and the latitude and an XY coordinate system, and packages and inputs the location and remaining information to the cooperative positioning apparatus. A format of data input from the second data processing module of the slave UUV to the cooperative positioning processing apparatus is shown in the table below, including 4-byte longitude INS_LON, 4-byte latitude INS_LAT, a 2-byte depth INS_DEP, a 2-byte velocity INS_VEL, a 2-byte heading INS_HEAD, and a 4-byte time INS_TIME.

| SYN | INS_LON | INS_LAT | INS_DEP | INS_VEL | INS_HEAD | INS_TIME |
|---|---|---|---|---|---|---|
| 1 | 4 | 4 | 2 | 2 | 2 | 4 |

After receiving the positioning packet, an underwater acoustic communication machine of the $i^{th}$ slave UUV records a time of arrival $t_{i,k}{}^a$ of the positioning packet, parses information in the cooperative positioning data packet, processes the longitude and the latitude of the master UUV in the cooperative positioning data packet to convert the longitude and the latitude into an XY coordinate system location $(x_{M,k}, y_{M,k})$=LB2XY$(L_{M,k}, B_{M,k})$, and inputs packaged data to the cooperative positioning processing apparatus after data packaging is completed. A format of the data input from an acoustic communication machine to the cooperative positioning processing apparatus is shown in the table below, including the 4-byte longitude M_LON, the 4-byte latitude M_LAT, the 2-byte depth M_DEP, the 2-byte velocity M_VEL, the 2-byte heading M_HEAD, the 4-byte positioning standard deviation in the X direction and in the Y direction M_UNCX and M_UNCY, the 4-byte time of emission M_TIMET, and a 4-byte time of arrival M_TIMER that are of the master UUV and that are obtained through parsing.

| SYN | M_LON | M_LAT | M_DEP | M_VEL | M_HEAD | M_UNCX | M_UNCY | M_TIMET | M_TIMER |
|---|---|---|---|---|---|---|---|---|---|
| 1 | 4 | 4 | 2 | 2 | 2 | 2 | 2 | 4 | 4 |

Step (4): The cooperative positioning apparatus establishes a state transition equation and a measurement equation, and performs filtering processing by using the parsed information in the cooperative positioning data packet to complete cooperative positioning. The method may include following steps.

Step (4-1): establishing a state vector and the state transition equation.

When the $i^{th}$ slave UUV is in a state of steady state operation, a motion status $\Psi_{Si,k}$ of the slave UUV at the $k^{th}$ positioning timeslot is expressed as a combination $\omega_{Si,k}$=$[x_{Si,k}, y_{Si,k}, \varphi_{Si,k}]^T$ of the XY coordinate system location and the heading. $[\cdot]^T$ represents a transpose operation.

Under an update frequency of the fixed period T', an estimation status of the $i^{th}$ slave UUV at the $k^{th}$ positioning timeslot $\Psi_{Si,k}=[\overline{x}_{Si,k}, \overline{y}_{Si,k}, \overline{\varphi}_{Si,k}]^T$, and a motion equation is expressed as $$\begin{cases} \overline{x}_{Si,k} = x_{Si,k-1} + T'v_{Si,k-1}\cos\varphi_{Si,k-1} \\ \overline{y}_{Si,k} = y_{Si,k-1} + T'v_{Si,k-1}\sin\varphi_{Si,k-1} \\ \overline{\varphi}_{Si,k} = \varphi_{Si,k-1} + T'\omega_{Si,k-1} \end{cases}$$

A current state is combined with a state cached in a preorder to construct a combined state vector $\Psi_{i,k}=[\Psi_{Si,k}^T, \Psi_{Si,k-1}^T, \Psi_{Si,k-N+1}^T]^T$. N represents a cached order, and a corresponding covariance matrix is $\overline{P}_{i,k}$. A combined motion prediction model $\Psi_{i,k}=f(\Psi_{i,k-1}, u_{Si,k-1})+n_{i,k}$. $u_{Si,k-1}$ represents a motion velocity of the slave UUV as a measurement input, and $n_k$ represents an estimation error, which follows Gaussian distribution. A state equation $f(\cdot,\cdot)$ is a nonlinear function about the state vector, with a Jacobi matrix of $F_{i,k}$, and linear processing of the prediction model is expressed as $\Psi_{i,k}=F_{i,k}\Psi_{i,k-1}F_{i,k}^T+B_i u_{Si,k-1}B_i^T+n_{i,k}$. $B_i$ represents an input control matrix.

A covariance matrix $\overline{P}_k$ corresponding to $\Psi_k$ is expressed as $\overline{P}_{i,k}=F_{i,k}P_{i,k-1}F_{i,k}^T+Q_{i,k}$. $Q_{i,k}$ is an introduced state transition error, $$Q_{i,k} = \begin{bmatrix} (T')^2\sigma^2_{v_{Si,k-1}}\cos^2\varphi_{Si,k-1} & (T')^2\sigma^2_{v_{Si,k-1}}\cos\varphi_{Si,k-1}\sin\varphi_{Si,k-1} & 0 \\ (T')^2\sigma^2_{v_{Si,k-1}}\sin\varphi_{Si,k-1}\cos\varphi_{Si,k-1} & (T')^2\sigma^2_{v_{Si,k-1}}\sin^2\varphi_{Si,k-1} & 0 \\ 0 & 0 & \sigma^2_{\varphi_{Si,k-1}} \end{bmatrix},$$

$\sigma_{v_{Si,k}}$ and $\sigma_{\phi_{Si,k}}$ respectively represent a standard deviation of velocity measurement and a standard deviation of heading measurement of the slave UUV.

After an augmentation operation is completed once on the state vector, $\Psi_{i,k}=[\Psi_{i,k}^T, \Psi_{i,k-1}]^T$, and the covariance matrix of the state vector is synchronously augmented and is modified and expressed as $$\overline{P}_{i,k} = \begin{bmatrix} Q_{i,k} & -F_{i,k}^T Q_{i,k} & 0 \\ -Q_{i,k}F_{i,k} & F_{i,k}Q_{i,k}F_{i,k}^T + P_{i,k-1}[1,1] & P_{i,k-1}[1,2] \\ 0 & P_{i,k-1}[2,1] & P_{i,k-1}[2,2] \end{bmatrix}.$$

$P_{i,k-1}[1,1]$, $P_{i,k-1}[1,2]$, $P_{i,k-1}[2,1]$ and $P_{i,k-1}[2,2]$ respectively represent upper left, upper right, lower left, and lower right submatrices of a covariance matrix $P_{i,k-1}$.

Step (4-2): augmenting the state vector, including:

The cooperative positioning apparatus adds the received information $\Psi_{M,k}$ of the master UUV on a basis of an original status to construct an augmented state vector $\Psi_{i,k}=[\Psi_{M,k}^T, \Psi_{M,k-2}^T, \ldots, \Psi_{M,1}^T, \Psi_{i,k}^T]^T$. A corresponding covariance matrix is $\tilde{P}_{i,k}$, $\tilde{P}_{i,k}=\overline{P}_{i,k}+P_{M,k}-P_{M,k-1}$, and $P_{M,k}$ represents a state covariance matrix of the master UUV.

Step (4-3): establishing the measurement equation, including:

Calculating a propagation range $r_{i,k}=c(t_{i,k}{}^a-t_k{}^e)$ according to the parsed time of emission $t_k{}^e$ and the locally recorded time of arrival $t_{i,k}{}^a$. c is an equivalent sound velocity.

At the $k^{th}$ positioning timeslot, expressing spatial location information of the $i^{th}$ slave UUV as $(\overline{x}_{Si,k}, \overline{y}_{Si,k}, d_{Si,k})$, and expressing spatial location information of the master UUV as $(x_{M,K}, y_{M,k}, d_{M,k})$.

Constructing a ranging equation $$h(\Psi_{i,k}) = \sqrt{(\overline{x}_{Si,k} - x_{M,k})^2 + (\overline{y}_{Si,k} - y_{M,k})^2 + (d_{Si,k} - d_{M,k})^2}$$

with respect to the state vector. Let measurement be affected by a white Gaussian noise $\eta_{Si,k}$ with a zero mean, a measurement model is expressed as $z_{i,k}=h(\Psi_{i,k})+\eta_{Si,k}=r_{i,k}$, and a measurement deviation matrix is $R_{i,k}$.

Step (4-4): filtering update.

Because measurement about the state vector refers to a nonlinear function, linear processing may be performed on measurement to obtain a Jacobi matrix H of measurement, including: introducing innovation gain K based on an EKF with reference to Step (4-1) to Step (4-3) to absorb innovation, to update a predicted state $\hat{\Psi}_{i,k}=\Psi_{i,k}+K_{i,k}(z_{i,k}-h(\Psi_{i,k})+H_{i,k}\Psi_{i,k})$. $\hat{\Psi}_{i,k}$ is an updated predicted state, $K_{i,k}$ is innovation gain at a timeslot k, $h(\Psi_{i,k})$ represents the ranging equation, and $H_{i,k}$ is a Jacobi matrix of the measurement equation.

Obtaining the innovation gain K by using a measurement matrix and a measurement deviation, and $K_{i,k}=\tilde{P}_{i,k}+H_{i,k}{}^T(H_{i,k}\tilde{P}_{i,k}H_{i,k}{}^T+R_{i,k})^{-1}$.

Synchronizing a covariance matrix $\hat{P}_{i,k}=(I-K_{i,k}H_{i,k})\tilde{P}_{i,k}$ of the updated state based on the updated state and the innovation gain. I is a unit matrix.

Step (4-5): obtaining a positioning result by using ranging information, including:

Extracting an updated location $(\hat{x}_{Si,k}, \hat{y}_{Si,k})$ of the $i^{th}$ slave UUV from $\hat{\Psi}_{i,k}$, and comparing the updated location with $(x_{Si-INS,k}, y_{Si-INS,k})$. In Step (3). When a difference of the two is less than a set threshold, updating is normal, the updated location is converted into latitude and longitude coordinates $(\hat{L}_{Si,k}, \hat{B}_{Si,k})=XY2LB(\hat{x}_{Si,k}, \hat{y}_{Si,k})$, and a cooperative positioning result is output, or when the difference between the two is greater than the set threshold, an updated result at this time is discarded. Or when the cooperative positioning apparatus fails to receive input data of the underwater acoustic communication machine, extracting a location $(\overline{x}_{Si,k}, \overline{y}_{Si,k})$ of the slave UUV from $\Psi_{i,k}$, converting the location into latitude and longitude coordinates $(\overline{L}_{Si,k}, \overline{B}_{Si,k})=XY2LB(\overline{x}_{Si,k}, \overline{y}_{Si,k})$, and outputting a cooperative positioning result.

Various embodiments of the disclosure may have one or more of the following effects. In some embodiments, the disclosure provides a cooperative positioning system for a UUV cluster based on ranging and information interaction for an existing requirement of cooperative positioning of a master-slave UUV cluster. When positioning uncertainty of a master vehicle is considered, cooperative positioning in the cluster is performed based on ranging and information interaction. In other embodiments, the disclosure may implement a connotation of cooperative positioning that if master and slave underwater vehicles may implement information sharing with each other, the slave vehicle may improve navigation and positioning precision of the slave vehicle by using positioning information of the master vehicle, thereby improving overall positioning capability of a cluster. In further embodiments, a cooperative positioning model between a master vehicle and a slave vehicle may be constructed by using ranging and information interaction between the vehicles, and overall positioning performance of the cluster may be improved with reference to a filtering method. In comparison with conventional methods, in the present disclosure, positioning uncertainty of the master UUV may be considered. The master UUV may package the key information into the cooperative positioning data packet and may send the cooperative positioning data packet to the slave UUV. The slave UUV may establish a new state vector by using both state information of the master UUV and the state information of the slave UUV, update the state vector after receiving the cooperative positioning data packet, and obtain the cooperative positioning result, which may further reduce impact of the positioning uncertainty of the master UUV on overall positioning performance of the cluster.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various FIGURES need be carried out in the specific order described.

The disclosure claimed is:

1. A cooperative positioning system for an unmanned underwater vehicle (UUV) cluster based on ranging and information interaction, comprising:
   (1) a master UUV, carrying a Doppler velocity log (DVL), a high-precision inertial navigation system (INS), a first satellite unit module, a first underwater acoustic communication machine, a first main control unit module, a first power system, a first data processing module, and a first clock module, wherein:
      the DVL is configured to lock water and water bottom and is configured to measure a velocity of the master UUV;
      the high-precision INS is configured to estimate a location and a corresponding motion posture of the master UUV;
      the first satellite unit module is configured to receive satellite location update and communication with a control center when the master UUV emerges from sea;
      the first underwater acoustic communication machine is configured to support underwater communication between the master UUV and a slave UUV and to enable the master UUV to report a status to the control center and receive an instruction and data of the control center;
      the first main control unit module is configured to control floating, diving, and task switching of the master UUV;
      the first power system is configured to output power required by the master UUV;
      the first data processing module is configured to output a location of the master UUV with reference to data of the DVL and the INS and to generate a cooperative positioning data packet; and
      the first clock module is configured to provide a clock reference;
   (2) a plurality of slave UUVs, each slave UUV carries a low-precision INS, a second satellite unit module, a second underwater acoustic communication machine, a second main control unit module, a second power system, a second data processing module, and a second clock module; wherein:

the low-precision INS is configured to output a positioning result and a corresponding motion posture of the slave UUV;

the second satellite unit module is configured to receive satellite location update and communication with the control center when the slave UUV emerges from sea;

the second underwater acoustic communication machine is configured to support underwater communication between the slave UUV and the master UUV and to receive the cooperative positioning data packet;

the second main control unit module is configured to control floating, diving, and task switching of the slave UUV and has an integrated function of communication and positioning;

the second power system is configured to output power required by the slave UUV;

the second data processing module is configured to process internal data of the slave UUV; and the second clock module is configured to provide another clock reference; and (3) a cooperative positioning apparatus installed on the slave UUV and configured to execute a cooperative positioning algorithm and to output a cooperative positioning result, wherein:

the cooperative positioning apparatus comprises a primary navigation unit and a secondary navigation unit, the primary navigation unit is configured to perform location estimation by using data of the INS of the slave UUV, and the secondary navigation unit is configured to perform filtering processing by using acoustic ranging and the cooperative positioning data packet;

the cooperative positioning apparatus provides two interfaces outwards: a communication interface in connection with the data processing module and a communication interface in connection with the underwater acoustic communication machine; interface communication uses a serial communication mode consisting of a ground cable, a transmitting TX, and a receiving RX, and uses a software handshaking XON/XOFF mode to establish a communication connection; and when communication is required, a receive end sends XON to a transmit end to start to receive data, and the transmit end starts to send data after receiving XON; or when no communication is required, the receive end feeds back XOFF to end communication;

(3-1) the communication interface in connection with the data processing module: inputs of the slave UUV, at a frequency of 1 Hz by default, longitude, latitude, velocity, heading, depth, and timestamp data that are acquired by the INS to the cooperative positioning apparatus, and the cooperative positioning apparatus outputs longitude and latitude data obtained after cooperative positioning to the slave UUV;

information interaction between the cooperative positioning apparatus and the slave UUV is as follows: the cooperative positioning apparatus sends XON to the second data processing module to start to receive the information when needing status information, and sends XOFF to end communication until there is no need; the second data processing module starts to send status information comprising longitude and latitude after receiving XON of the cooperative positioning apparatus, and stops sending until receiving XOFF; the second data processing module sends XON to the cooperative positioning apparatus when needing the cooperative positioning result, and sends XOFF to stop communication until the result is not needed; and the cooperative positioning apparatus starts to send the cooperative positioning result after receiving XON of the slave UUV, and stops sending until receiving XOFF; and (3-2) the communication interface in connection with the underwater acoustic communication machine: after receiving the cooperative positioning data packet of the master UUV, the second underwater acoustic communication machine inputs, to the cooperative positioning apparatus, parsed packet information and a time of arrival that is of the cooperative positioning data packet and that is recorded by the underwater acoustic communication machine;

information interaction between the cooperative positioning apparatus and the second acoustic communication receiver is as follows: the cooperative positioning apparatus sends XON to the second underwater acoustic communication machine when needing information received by the second underwater acoustic communication machine, and sends XOFF until the information is not needed; and the second underwater acoustic communication machine receives, after receiving XON, the cooperative positioning data packet of the master UUV and inputs cooperative positioning data packet and a time of arrival of the cooperative positioning data packet to the cooperative positioning apparatus, and stops sending until receiving XOFF.

2. The cooperative positioning system according to claim 1, wherein a working mode of the cooperative positioning system is as follows:

the master UUV fuses the data of the DVL and the high-precision INS, outputs a high-precision reference location of the master UUV, packages key information into the cooperative positioning data packet, and broadcasts the cooperative positioning data packet to the slave UUVs in the cluster at a fixed time interval by using the first underwater acoustic communication machine, wherein the key information comprises the location of the master UUV, information about a state covariance matrix, and a sending timestamp; and the low-precision INS of the slave UUV has a high update frequency, and uses data that is acquired by the low-precision INS and that comprises longitude and latitude as that of the primary navigation unit in the cooperative positioning apparatus; the secondary navigation unit in the cooperative positioning apparatus has a low update frequency; after receiving the cooperative positioning data packet of the master UUV, the second underwater acoustic communication machine records a time of arrival of the cooperative positioning data packet, and inputs the time of arrival and parsed content of the cooperative positioning data packet to the cooperative positioning apparatus; and the cooperative positioning apparatus performs cooperative positioning processing according to information input by the second underwater acoustic communication machine, and outputs updated positioning information to the slave UUV to complete cooperative positioning.

3. A cooperative positioning method using the cooperative positioning system according to claim 1, comprising following steps:

step (1): performing, by a master UUV and a slave UUV, internal clock disciplining before being launched into water, keeping clock synchronization, and starting underwater work after disciplining is completed; and starting, by a first satellite unit module of the master UUV and a second satellite unit module of the slave UUV, to work, and initializing positioning information of the master UUV and the slave UUV;

step (2): after a stable working state is entered, generating, by a first data processing module of the master UUV, a cooperative positioning data packet at a fixed period T', wherein the cooperative positioning data packet comprises longitude $L_{M,k}$, latitude $B_{M,k}$, a depth $d_{M,k}$, a velocity $v_{M,k}$, a heading $\varphi_{M,k}$, a positioning standard deviation in an X direction $\sigma_{Mx,k}$, a positioning standard deviation in a Y direction $\sigma_{My,k}$, and a packet time of emission $t_k^e$, and a subscript M represents the master UUV and a subscript k represents a $k^{th}$ positioning timeslot; and broadcasting the cooperative positioning data packet to slave UUVs in a cluster;

step (3): after receiving the cooperative positioning data packet, recording, by a second underwater acoustic communication machine, a time of arrival $t_k^a$ of the cooperative positioning data packet, parsing information in the cooperative positioning data packet, and processing the longitude and the latitude of the master UUV in the cooperative positioning data packet to convert the longitude and the latitude into an XY coordinate system location $(x_{M,k}, y_{M,k})$=LB2XY($L_{M,k}$, $B_{M,k}$) wherein LB2XY(•,•) represents a conversion operation between the longitude and the latitude and an XY coordinate system; and obtaining, by a second data processing module, data of an INS, comprising longitude $L_{S,k}$, latitude $B_{S,k}$, a depth $d_{S,k}$, a velocity $v_{S,k}$, a heading $\varphi_{S,k}$, and angular acceleration $\omega_{S,k}$ that are of the slave UUV, wherein a subscript S represents the slave UUV, processing the longitude and the latitude of the slave UUV in the data to convert the longitude and the latitude into an XY coordinate system location $(x_{S,k}, y_{S,k})$=LB2XY($L_{S,k}$, $B_{S,k}$), and inputting, to a cooperative positioning apparatus, a location of the master UUV, a location of the slave UUV, the parsed information of the cooperative positioning data packet, and remaining output information of the second data processing module of the slave UUV; and step (4): establishing, by the cooperative positioning apparatus, a state transition equation and a measurement equation, and performing filtering processing by using the parsed information in the cooperative positioning data packet to complete cooperative positioning, comprising:

step (4-1): establishing a state vector and the state transition equation, wherein:

when the slave UUV is in a state of steady state operation, a motion status $\Psi_{S,k}$ of the slave UUV at the $k^{th}$ positioning timeslot is expressed as a combination $\Psi_{S,k}=[x_{S,k}, y_{S,k}, \varphi_{S,k}]^T$ of the XY coordinate system location and the heading, wherein $[\cdot]^T$ represents a transpose operation;

under an update frequency of the fixed period T', an estimation status of the slave UUV at the $k^{th}$ positioning timeslot, $\overline{\Psi}_{S,k}=[\overline{x}_{S,k}, \overline{y}_{S,k}, \overline{\varphi}_{S,k}]^T$, and a motion equation is expressed as $$\begin{cases} \overline{x}_{S,k} = x_{S,k-1} + T' v_{S,k-1} \cos\varphi_{S,k-1} \\ \overline{y}_{S,k} = y_{S,k-1} + T' v_{S,k-1} \sin\varphi_{S,k-1} \\ \overline{\varphi}_{S,k} = \varphi_{S,k-1} + T' \omega_{S,k-1} \end{cases};$$

a current state is combined with a state cached in a preorder to construct a combined state vector $\overline{\Psi}_k [\Psi_{S,k}^T, \Psi_{S,k-1}^T, \ldots, \Psi_{S,k-N+1}^T]^T$, wherein N represents a cached order, and a corresponding covariance matrix is $\overline{P}_k$;

a combined motion prediction model is $\overline{\Psi}_k = f(\Psi_{k-1}, u_{S,k-1}) + n_k$, wherein $u_{S,k-1}$ represents a motion velocity of the slave UUV as a measurement input, and $n_k$ represents an estimation error, which follows Gaussian distribution; a state equation $f(\cdot,\cdot)$ is a nonlinear function about the state vector, with a Jacobi matrix of $F_k$, and linear processing of the prediction model is expressed as $\overline{\Psi}_k = F_k \Psi_{k-1} F_k^T + B u_{S,k-1} B^T + n_k$, wherein B represents an input control matrix;

a covariance matrix $\overline{P}_k$ corresponding to $\overline{\Psi}_k$ is expressed as $\overline{P}_k = F_k P_{k-1} F_k^T + Q_k$, wherein $Q_k$ is an introduced state transition error, $$Q_k = \begin{bmatrix} (T')^2 \sigma_{v_{S,k-1}}^2 \cos^2\varphi_{S,k-1} & (T')^2 \sigma_{v_{S,k-1}}^2 \cos\varphi_{S,k-1}\sin\varphi_{S,k-1} & 0 \\ (T')^2 \sigma_{v_{S,k-1}}^2 \sin\varphi_{S,k-1}\cos\varphi_{S,k-1} & (T')^2 \sigma_{v_{S,k-1}}^2 \sin^2\varphi_{S,k-1} & 0 \\ 0 & 0 & \sigma_{\varphi_{S,k-1}}^2 \end{bmatrix},$$

$\sigma_{v_{S,k}}$ and $\sigma_{\varphi_{S,k}}$ respectively represent a standard deviation of velocity measurement and a standard deviation of heading measurement of the slave UUV; and after an augmentation operation is completed once on the state vector, $\overline{\Psi}_k = [\Psi_k^T, \Psi_{k-1}^T]^T$, and the covariance matrix of the state vector is synchronously augmented and is modified and expressed as $$\overline{P}_k = \begin{bmatrix} Q_k & -F_k^T Q_k & 0 \\ -Q_k F_k & F_k Q_k F_k^T + P_{k-1}[1,1] & P_{k-1}[1,2] \\ 0 & P_{k-1}[2,1] & P_{k-1}[2,2] \end{bmatrix},$$

wherein $P_{k-1}[1,1]$, $P_{k-1}[1,2]$, $P_{k-1}[2,1]$, and $P_{k-1}[2,2]$ respectively represent upper left, upper right, lower left, and lower right submatrices of a covariance matrix $P_{k-1}$;

step (4-2): augmenting the state vector, comprising:
adding, by the cooperative positioning apparatus, the received information $\Psi_{M,k}$ of the master UUV on a basis of an original status to construct an augmented state vector $\tilde{\Psi}_k = [\Psi_{M,k}^T, \Psi_{M,k-2}^T, \ldots, \Psi_{M,1}^T, \overline{\Psi}_k^T]^T$, wherein a corresponding covariance matrix is $\tilde{P}_k$, $\tilde{P}_k = \overline{P}_k + P_{M,k} - P_{M,K-1}$, and $P_{M,k}$ represents a state covariance matrix of the master UUV;

step (4-3): establishing the measurement equation, comprising:
calculating a propagation range $r_k = c(t_k^a - t_k^e)$ according to the parsed time of emission $t_k^e$ and a locally recorded time of arrival $t_k^a$, wherein c is an equivalent sound velocity;

at the $k^{th}$ positioning timeslot, expressing spatial location information of the slave UUV as ($\overline{x}_{S,k}$, $\overline{y}_{S,k}$, $d_{S,k}$), and expressing spatial location information of the master UUV as ($x_{M,k}$, $y_{M,k}$, $d_{M,k}$); and constructing a ranging equation $$h(\Psi_k) = \sqrt{(\overline{x}_{S,k} - x_{M,k})^2 + (\overline{y}_{S,k} - y_{M,k})^2 + (d_{S,k} - d_{M,k})^2}$$

with respect to the state vector, wherein let measurement be affected by a white Gaussian noise $\eta_{S,k}$ with a zero mean, a measurement model is expressed as $z_k = h(\Psi_k) + \eta_{S,k} = r_k$, and a measurement deviation matrix is $R_k$;

step (4-4): filtering update, comprising:
introducing innovation gain based on an extended Kalman filter (EKF) to absorb innovation, to update a predicted state, wherein an updated predicted state $\hat{\Psi}_k = \Psi_k + K_k(z_k - h(\Psi_k) + H_k\Psi_k)$, $K_k$ is innovation gain at a timeslot k, $h(\Psi_k)$ represents the ranging equation, and $H_k$ is a Jacobi matrix of the measurement equation;

obtaining innovation gain K by using a measurement matrix and a measurement deviation, and $K_k = \tilde{P}_k + H_k^T(H_k\tilde{P}_kH_k^T + R_k)^{-1}$; and synchronizing a covariance matrix $\hat{P}_k = (I - K_kH_k)\tilde{P}_k$ of the updated state based on the updated state and the innovation gain, wherein I is a unit matrix; and step (4-5): obtaining a positioning result by using ranging information, comprising:
extracting an updated location ($\hat{x}_{S,k}$, $\hat{y}_{S,k}$) of the slave UUV from $\hat{\Psi}_k$, and comparing the updated location with ($x_{S,k}$, $y_{S,k}$) in step (3), wherein when a difference of the two is less than or equal to a set threshold, updating is normal, the updated location is converted into latitude and longitude coordinates ($\hat{L}_{S,k}, \hat{B}_{S,k}$)=XY2LB($\hat{x}_{S,k}, \hat{y}_{S,k}$), and a cooperative positioning result is output, or when the difference between the two is greater than the set threshold, an updated result at this time is discarded; or when the cooperative positioning apparatus fails to receive input data of the underwater acoustic communication machine, extracting a location ($\overline{x}_{S,k}, \overline{y}_{S,k}$) of the slave UUV from $\Psi_k$, converting the location into latitude and longitude coordinates ($\overline{L}_{S,k}, \overline{B}_{S,k}$)=XY2LB($\overline{x}_{S,k}, \overline{y}_{S,k}$), and outputting a cooperative positioning result.

\* \* \* \* \*